US011724141B2

(12) United States Patent
Coletta et al.

(10) Patent No.: US 11,724,141 B2
(45) Date of Patent: Aug. 15, 2023

(54) SPRINKLER SYSTEM ADAPTERS

(71) Applicant: Tyco Fire Products LP, Lansdale, PA (US)

(72) Inventors: George B. Coletta, West Warwick, RI (US); Matthew C. Neal, Coventry, RI (US)

(73) Assignee: Tyco Fire Products LP, Cranston, RI (US)

( * ) Notice: Subject to any disclaimer, the term of this patent is extended or adjusted under 35 U.S.C. 154(b) by 13 days.

(21) Appl. No.: 17/366,418

(22) Filed: Jul. 2, 2021

(65) Prior Publication Data

US 2022/0001224 A1 Jan. 6, 2022

Related U.S. Application Data

(60) Provisional application No. 63/048,428, filed on Jul. 6, 2020.

(51) Int. Cl.
*A62C 35/68* (2006.01)
*B05B 15/65* (2018.01)

(52) U.S. Cl.
CPC .............. *A62C 35/68* (2013.01); *B05B 15/65* (2018.02)

(58) Field of Classification Search
CPC ......... A62C 31/02; A62C 31/28; A62C 35/68; B05B 15/65
USPC ............................................. 169/37; 239/601
See application file for complete search history.

(56) References Cited

U.S. PATENT DOCUMENTS 8,459,370 B2 * 6/2013 Orr ........................ A62C 35/00
169/37
10,471,288 B2 * 11/2019 Bancroft ................ A62C 37/14

FOREIGN PATENT DOCUMENTS

WO WO-2019051279 A1 * 3/2019 ............. A62C 35/58

* cited by examiner

*Primary Examiner* — Christopher S Kim
(74) *Attorney, Agent, or Firm* — Foley & Lardner LLP

(57) ABSTRACT

A sprinkler assembly includes a pipe, a sprinkler, and an adapter. The adapter includes an end wall that contacts the pipe, a sprinkler interface extending from the end wall that receives the sprinkler and fluidly couples the sprinkler with the pipe, and a gasket positioned in the sprinkler interface between the sprinkler and the pipe.

16 Claims, 2 Drawing Sheets

SPRINKLER SYSTEM ADAPTERS

CROSS-REFERENCE TO RELATED APPLICATIONS

The present application claims the benefit of and priority to U.S. Provisional Application No. 63/048,428 filed Jul. 6, 2020, the disclosure of which is incorporated herein by reference in its entirety.

BACKGROUND

Fire suppression systems use sprinklers to distribute fire suppressant over an area. The sprinklers can be installed by coupling the sprinklers to piping connected with a source of the fire suppressant.

SUMMARY

At least one aspect relates to a sprinkler assembly. The sprinkler assembly includes a pipe, a sprinkler, and an adapter. The adapter includes an end wall that contacts the pipe, a sprinkler interface extending from the end wall that receives the sprinkler and fluidly couples the sprinkler with the pipe, and a gasket positioned in the sprinkler interface between the sprinkler and the pipe.

At least one aspect relates to a sprinkler assembly. The sprinkler assembly includes a pipe, a sprinkler, an adapter, and a pipe coupling. The adapter includes a sprinkler interface that receives the sprinkler, and a pipe interface positioned around the sprinkler interface and contacts the pipe. The pipe coupling is positioned around the pipe and the adapter to secure the pipe with the adapter.

At least one aspect relates to an adapter of a sprinkler assembly. The adapter includes an end wall that faces a pipe, a sprinkler interface that extends from the end wall, and a gasket positioned in the sprinkler interface. The end wall has an outer diameter that is within a threshold difference of an outer diameter of the pipe. The sprinkler interface defines an aperture that receives a sprinkler to fluidly couple the sprinkler with the pipe. An outer diameter of at least a portion of the sprinkler interface is less than an inner diameter of the pipe.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The present disclosure relates generally to fire suppression systems, and more particularly to an adapter of a sprinkler assembly that can facilitate connecting a sprinkler (e.g., sprinkler head) to piping of the fire suppression system. Fire suppression systems include sprinkler heads, which define an outlet for fire suppressant (e.g., water, fire suppressant agent, etc.). The outlet facilitates dispersing of the fire suppressant over a hazard area. The fire suppression system includes one or more pipes extending at an angle (e.g., 90°, less than 90°, etc.) from a network of pipes. The pipes direct the fire suppressant from a source to the sprinkler heads. The sprinkler heads can be coupled with the pipes during installation of the fire suppression system or can be coupled with the pipes as a retrofit installation.

Systems and methods as described herein can include an adapter that can be coupled with the pipe and to a sprinkler to connect the sprinkler with the pipe. The adapter can include an end wall that contacts the pipe, a sprinkler interface extending from the end wall that receives the sprinkler and fluidly couples the sprinkler with the pipe, and a gasket positioned in the sprinkler interface between the sprinkler and the pipe. Further, sensors can be provided within the adapter to detect fire conditions.

The adapter can reduce torque for installing the sprinkler, which can facilitate easier installation of the sprinkler and avoid damage to the sprinkler. For example, the adapter can enable the sprinkler to be implemented as a national pipe taper (NPT) thread sprinkler, such as a ½ inch NPT sprinkler, that can be connected with 1¼ inch or 1½ inch couplings (e.g., standard groove couplings), rather than using sealant and relatively high torque application to make such a connection. For example, the sprinkler can be threaded by hand into the adapter (e.g., with relatively low torque application), and as such can be installed in relatively short time frames, allowing for inspect of the sprinkler just prior to installation.

Figure 1:
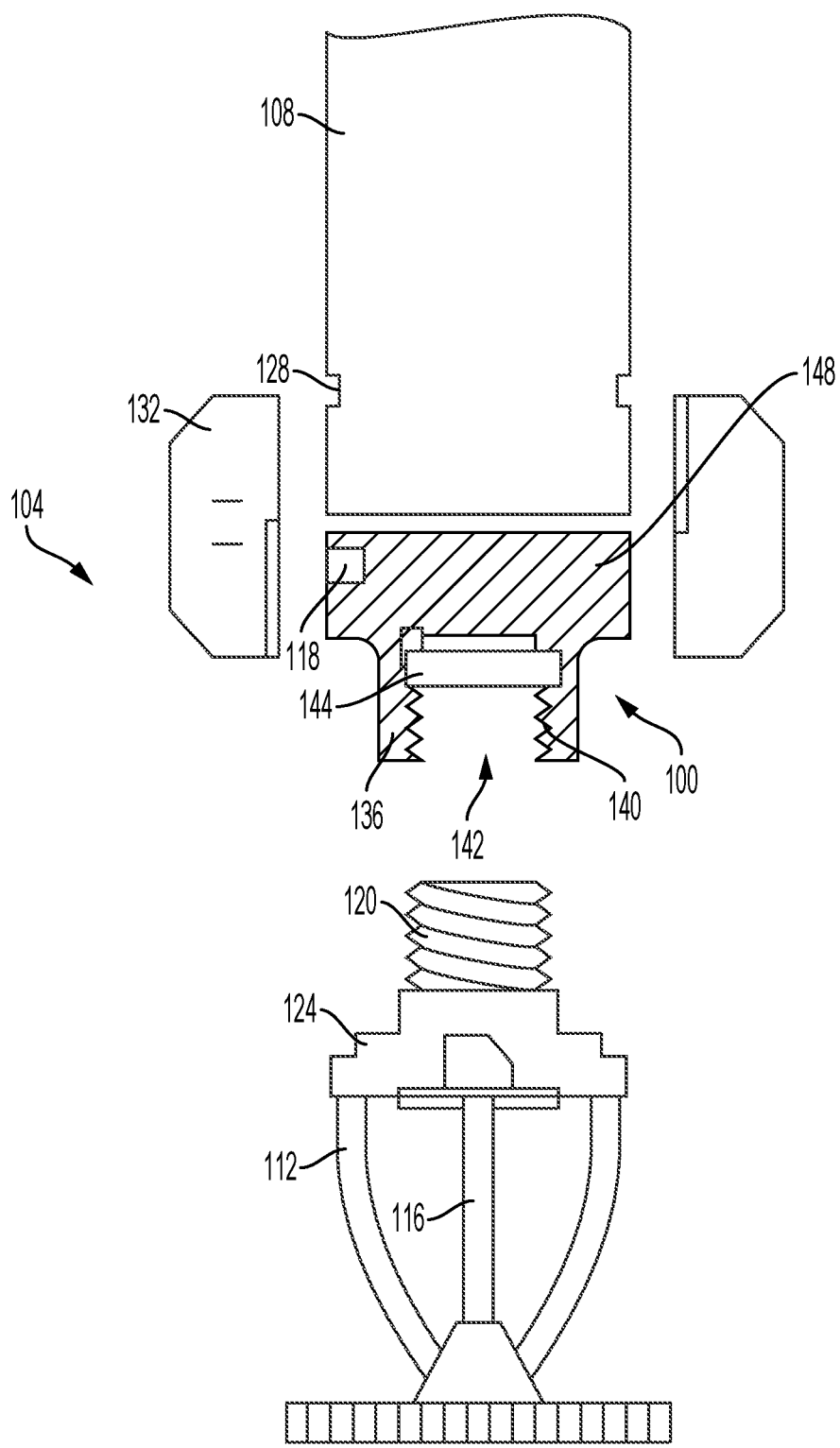
FIG. 1 is a schematic diagram of a sprinkler assembly.

FIG. 1 depicts an adapter 100 that can be used in a sprinkler assembly 104 for a fire suppression system. The fire suppression system may be provided within a building (e.g., residential, commercial, etc.). The sprinkler assembly 104 can include a pipe 108, the adapter 100, and a sprinkler 112.

The pipe 108 can provide fluid from a fluid source to the sprinkler 112. The pipe 108 can extend from a piping system that connects the pipe 108 with the fluid source. For example, the piping system can direct a fire suppressant fluid from a reservoir of fire suppressant to the pipe 108. The pipe 108 may extend perpendicular from the piping system or may extend at an angle less than perpendicular from the piping system. The pipe 108 can be a schedule 40 grooved pipe, such as a pipe having a diameter greater than or equal to one inch and less than or equal to 1.5 inches.

The fire suppression system may also include detection devices that can detect a fire condition. The detection devices may be mechanical or electrical. Electrical detection devices (e.g., sensors, smoke detectors, thermal detectors, linear thermal detection line, etc.) may sense a fire condition within an area provided with the fire suppression system and send a signal to a controller (not shown). The controller facilitates activation of the fire suppression system. Mechanical detection devices (e.g., fusible links, glass bulbs, etc.) may be thermally reactive and activate the fire suppression system once exposed to a threshold amount of heat. For example, the sprinkler 112 can include a detection device 116 to facilitate activation of the fire suppression system.

The sprinkler 112 can include a sprinkler thread 120 at an inlet end of the sprinkler 112 (e.g., an end that couples with the adapter 100), extending from a base 124. The sprinkler thread 120 can be used to connect the sprinkler 112 with the adapter 100. The base 124 can be sized to be received by at least a portion of the adapter 100. The sprinkler thread 120 can be NPT thread, such as ½ inch NPT thread.

The adapter 100 can include a sensor 118, which can be an electrical or mechanical detection device that outputs a signal that a controller uses to cause operation of the sprinkler 112 (e.g., in applications where the sprinkler 112 is an electronically controlled sprinkler). For example, the sensor 118 can output the signal to a controller that causes an actuator (e.g., a component that can be moved or driven to break the detection device 116, or can apply heat or electricity to the detection device 116 to break the detection device 116) to change the sprinkler 112 from a closed state to an open state.

The adapter 100 can connect with an outlet end of the pipe 108 (e.g., an end of the pipe 108 opposite from an inlet end at which the pipe 108 receives fluid). For example, the adapter 100 can be positioned adjacent to the pipe 108 (and can be secured with the pipe 108 using pipe coupling 132 as described further herein).

The sprinkler 112 can connect with the adapter 100 to be in fluid communication with the pipe 108 as fluid flows from the pipe 108 through the adapter 100 into the sprinkler 112. The adapter 100 can be used in a preventative application (e.g., the adapter 100 is installed in the sprinkler assembly 104 before the construction of a building that uses the sprinkler assembly 104 is complete). The adapter 100 can also be used in a reactive or retrofit application (e.g., the adapter 100 is installed in the sprinkler assembly 104 after the construction has been complete).

The sprinkler assembly 104 can include a pipe coupling 132 that fastens the adapter 100 with the pipe 108. The pipe coupling 132 can be a grooved pipe coupling 132, such as the Model 579 One-Bolt Coupling manufactured by TYCO FIRE PRODUCTS.

The pipe coupling 132 can engage a groove 128 that extends around the pipe 108 to secure the pipe 108 with the adapter 100. Adjacent end faces of the adapter 100 and pipe 108 can contact one another while fastened by the pipe coupling 132. For example, the adapter 100 can define an end wall 148 that contacts the pipe 108. The adapter 100 can have an outer diameter that is substantially equal to an outer diameter of the pipe 108, such as being within a threshold difference of the outer diameter of the pipe (e.g., within ten percent; within five percent; within one percent; within manufacturing tolerances sufficient to enable the pipe coupling 132 to couple the adapter 100 with the pipe 108).

The adapter 100 can define a sprinkler interface 136 that receives the sprinkler 112 (e.g., in aperture 142). For example, the sprinkler interface 136 can include threads 140 that engage the sprinkler thread 120 of the sprinkler 112. At least a portion of the sprinkler interface 136 can define an outer diameter that is less than an inner diameter of the pipe 108 (e.g., the adapter 100 can increase in diameter outward from the sprinkler interface 136 to the end wall 148). The adapter 100 can be sized so that the wall defining the sprinkler interface 136 extends beyond the pipe coupling 132.

The adapter 100 can include a gasket 144 (e.g., o-ring seal) positioned in the sprinkler interface 136, so that the gasket 144 is received between the sprinkler 112 and the pipe 108. The gasket 144 can enable the sprinkler 112 to be sealed with the adapter 100 responsive to engagement of the sprinkler thread 120 with the thread 140, facilitating installation of the sprinkler 112 with the pipe 108.

Figure 2:
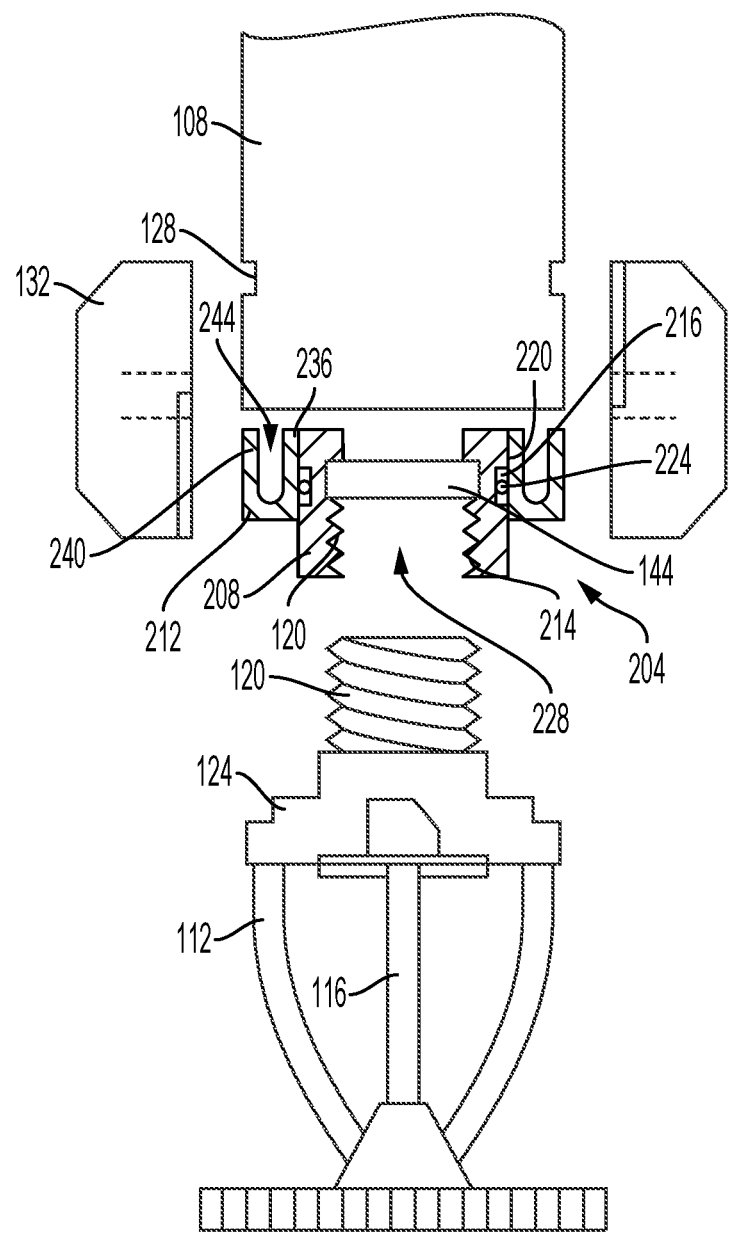
FIG. 2 is a schematic diagram of a sprinkler assembly.

FIG. 2 depicts a sprinkler assembly 200 that includes an adapter 204. The sprinkler assembly 200 can incorporate features of the sprinkler assembly 104 described with reference to FIG. 1. The sprinkler assembly 200 can include the sprinkler 112, the pipe 108, and the pipe coupling 132. Components of the sprinkler assembly 200 can be formed and coupled by forging, extruding, or forming steel, clad, wrought copper, or composites.

The adapter 204 can include a sprinkler interface 208 and a pipe interface 212 that can be positioned around the sprinkler interface 208. The sprinkler interface 208 can incorporate features of the adapter 100. For example, the sprinkler interface 208 can include threads 214 that engage with the sprinkler thread 120 to receive the sprinkler 112 in the sprinkler interface 208. The sprinkler interface 208 can receive the gasket 144 to seal the sprinkler 112 responsive to receiving the sprinkler 112 in the sprinkler interface 208. The sprinkler interface 208 can have an outer diameter less than an outer diameter of the pipe 108.

The sprinkler interface 208 can include a groove 216. The groove 216 can be defined in an outer wall 220 of the sprinkler interface 208. The groove 216 can be located closer to an outlet end (e.g., an end by which the sprinkler 112 is received) than an inlet end of the sprinkler interface 208 to facilitate effective alignment of the adapter, sprinkler interface 208, and pipe interface 212. The groove 216 can be provided around a perimeter of the sprinkler interface 208.

A first seal 224 can be positioned within the groove 216. The first seal 224 can form a seal between the sprinkler interface 208 and the pipe interface 212, such as to prevent fluid flow out of the pipe 108 from the connection between the sprinkler interface 208 and the pipe interface 212.

The sprinkler interface 208 defines an aperture 228 (e.g., cavity, channel). The aperture 228 extends through the sprinkler interface 208 from an outlet end (e.g., an end through which the sprinkler 112 is received) to an inlet end (e.g., an end that faces the pipe 108). Interface threads 232 can be defined within the aperture 228. The aperture 228 and the interface threads 232 can be sized larger than an outer diameter of the sprinkler 112. The sprinkler 112 can be partially received by the aperture 228.

The pipe interface 212 can be an annular member. The pipe interface 212 can have a U-shaped cross section. The pipe interface 212 can include a first leg 236 and a second leg 240. The legs 236, 240 can define a cavity 244 between the first leg 236 and a second leg 240. The first leg 236 can be positioned inward relative to the second leg 240, such as to be positioned adjacent to the sprinkler interface 208 and the first seal 224. A distance between the first leg 236 and the second leg 240 can be larger or the same as a width of a wall of the pipe 108. At least a portion of the pipe 108 can be received in the cavity 244 between the first leg 236 and the second leg 240.

In an assembled configuration, the pipe interface 212 contacts the pipe 108. The pipe interface 212 can be press fit onto the pipe 108, such that adhesives are omitted. The sprinkler interface 208 can be received by the pipe interface 212. The first seal 224 can be disposed within the groove 216 between the first leg 236 of the pipe interface 212 and the sprinkler interface 208. The first seal 224 can interface with (e.g., contact each of) the sprinkler interface 208 and the first leg 236 of the pipe interface 212 to form a fluid seal. A portion of the inlet end of the sprinkler interface 208 may be received by the outlet end of the pipe 108. The sprinkler 112 can be received by the aperture 228 in the sprinkler interface 208. The aperture 228 and the cavity 244 can face in opposite directions. The sprinkler thread 120 can engage the interface thread 214 to couple the sprinkler 112 with the adapter 204. The pipe 108 can include the groove 128. The pipe coupling 132 can be coupled with the pipe 108, the sprinkler 112, and the adapter 204. The pipe coupling 132 can couple with the groove 128 in the pipe 108 on a first side, and at least one of the base of the sprinkler 112, the pipe interface 212, and the sprinkler interface 208. The pipe coupling 132 can limit movement of at least one of the sprinkler 112 and the adapter 204 relative to the pipe 108. The adapter 204 can include a sensor or detection device (e.g., sensor 118 described with reference to FIG. 1) that facilitates activation of the fire suppression system.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act, or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical, or other positioning or orientation descriptions include variations within +/−10% or +/−10 degrees of pure vertical, parallel, or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A sprinkler assembly, comprising:
   a pipe;
   a sprinkler; and
   an adapter comprising:
   an end wall positioned adjacent a corresponding end face of the pipe to contact the end face, an outer diameter of the end wall is substantially equal to an outer diameter of the end face;
   a sprinkler interface extending from the end wall that receives the sprinkler and fluidly couples the sprinkler with the pipe;

a sensor to provide a signal for a controller to trigger activation of the sprinkler; and a gasket removably positioned in the sprinkler interface between the sprinkler and the pipe.

2. The sprinkler assembly of claim 1, comprising:
a pipe coupling positioned around the pipe and the adapter to secure the pipe with the adapter.

3. The sprinkler assembly of claim 1, comprising:
an outer diameter of the sprinkler interface is less than an inner diameter of the pipe.

4. The sprinkler assembly of claim 1, comprising:
the sprinkler comprises a pipe thread to engage a sprinkler thread of the sprinkler interface, and the pipe has an inner diameter greater than an outer diameter of the pipe thread.

5. The sprinkler assembly of claim 1, comprising:
the sprinkler interface includes a thread that engages with a sprinkler thread of the sprinkler.

6. A sprinkler assembly, comprising:
a pipe;
a sprinkler;
an adapter comprising:
  a sprinkler interface that receives the sprinkler; and
  a pipe interface positioned around the sprinkler interface, the pipe interface contacts the pipe, the pipe interface comprising a first leg and a second leg defining a cavity between the first leg and the second leg, the cavity faces an opposite direction from a direction by which the sprinkler interface receives the sprinkler; and
a pipe coupling positioned around the pipe and the adapter to secure the pipe with the adapter.

7. The sprinkler assembly of claim 6, comprising:
a seal in a groove defined by an outer wall of the sprinkler interface, the seal between the sprinkler interface and the pipe interface.

8. The sprinkler assembly of claim 6, comprising:
a gasket positioned in the sprinkler interface.

9. The sprinkler assembly of claim 6, comprising:
an outer diameter of the sprinkler interface is less than an inner diameter of the pipe.

10. The sprinkler assembly of claim 6, comprising:
the sprinkler interface includes a thread that engages with a sprinkler thread of the sprinkler.

11. The sprinkler assembly of claim 6, comprising:
an outer diameter of the pipe interface is within a threshold difference of an outer diameter of the pipe.

12. The sprinkler assembly of claim 6, comprising:
at least a portion of the sprinkler has an outer diameter greater than an inner diameter of the sprinkler interface.

13. The sprinkler assembly of claim 6, comprising:
a sensor to provide a signal for a controller to trigger activation of the sprinkler.

14. An adapter of a sprinkler assembly, comprising:
an end wall that faces an end face of a pipe, the end wall has an outer diameter that is within a threshold difference of an outer diameter of the end face of the pipe;
a sprinkler interface extending from the end wall, the sprinkler interface defines an aperture that receives a sprinkler to fluidly couple the sprinkler with the pipe, an outer diameter of at least a portion of the sprinkler interface is less than an inner diameter of the pipe;
a sensor to provide a signal for a controller to trigger activation of the sprinkler; and
a gasket removably positioned in the sprinkler interface.

15. The adapter of claim 14, comprising:
the sprinkler interface includes a thread that engages with a sprinkler thread of the sprinkler.

16. The adapter of claim 14, comprising:
the gasket is positioned in the portion of the sprinkler interface of which the outer diameter is less than the inner diameter of the pipe.

* * * * *